United States Patent
Ma

(10) Patent No.: US 7,778,316 B2
(45) Date of Patent: Aug. 17, 2010

(54) DETECTING CHANNEL IMPULSE MAGNITUDE RESPONSE IN DIGITAL COMMUNICATION SYSTEMS

(75) Inventor: Jun Ma, Irvine, CA (US)

(73) Assignee: Newport Media, Inc., Lake Forest, CA (US)

( * ) Notice: Subject to any disclaimer, the term of this patent is extended or adjusted under 35 U.S.C. 154(b) by 946 days.

(21) Appl. No.: 11/559,540

(22) Filed: Nov. 14, 2006

(65) Prior Publication Data

US 2008/0112475 A1   May 15, 2008

(51) Int. Cl.
H04B 17/00  (2006.01)
(52) U.S. Cl. .................. 375/224; 375/227; 375/230; 375/232; 375/229
(58) Field of Classification Search .......... 375/224, 375/232, 24, 226, 230
See application file for complete search history.

(56) References Cited

U.S. PATENT DOCUMENTS

| 7,218,604 | B2 * | 5/2007 | Hosur et al. | 370/203 |
| 2003/0081695 | A1 | 5/2003 | Eilts et al. | |
| 2004/0196933 | A1 | 10/2004 | Shan et al. | |
| 2005/0069054 | A1 | 3/2005 | Zhidkov | |
| 2009/0034407 | A1 * | 2/2009 | Lindh | 370/210 |

* cited by examiner

Primary Examiner—Shuwang Liu
Assistant Examiner—Dhaval Patel
(74) Attorney, Agent, or Firm—Rahman LLC

(57) ABSTRACT

A system and method of detecting the location and magnitude of multi-path echoes in a channel impulse response by going through the channel impulse magnitude response only once and detecting all the multi-path echoes, both location and magnitude, according to certain threshold criteria. The impulse magnitude response samples are processed on-the-fly (on demand) and do not require the storage of the entire channel impulse magnitude response which makes it ideal for ASIC implementation.

20 Claims, 8 Drawing Sheets

DETECTING CHANNEL IMPULSE MAGNITUDE RESPONSE IN DIGITAL COMMUNICATION SYSTEMS

BACKGROUND

1. Technical Field

The embodiments herein generally relate to communication systems, and, more particularly, to techniques for analyzing channel characteristics in digital communication systems.

2. Description of the Related Art

Channel Impulse Response (CIR) is an important metric in describing the channel characteristic in digital communication systems. Channel State Information (CSI) is defined as the channel response to an input stimulate of an impulse signal. In an ideal channel condition, the channel impulse response is a single tap impulse, usually referred to as a main tap. For non-ideal channel conditions, which are usually the case in the real world, echoes due to multi-path reflections exist. These multi-path echoes can be either post cursor echoes which exist after the channel main tap, or pre cursor echoes which exist before the channel main tap.

Multi-path echoes, which are usually unknown to the receiver, for example a Digital Video Broadcasting over Handheld (DVB-H) receiver, can cause inter symbol interference (ISI) in digital communication systems which typically degrade the received signal quality. Accordingly, equalization techniques are employed in the receiver design to remove or compensate for the inter symbol interference caused by the multi-path echoes.

The channel equalization is an important and extensively studied topic in the digital communication world. In order to achieve efficient channel equalization, the knowledge of channel impulse response, or at least the magnitude of the channel impulse response, can be very helpful to design efficient equalization techniques. For example, in wireless communications, the sparseness of the wireless channel impulse magnitude response can be explored to develop efficient equalization algorithms to track very long multi-path echoes in Digital Terrestrial Television (DTV) systems. These techniques require the detection of the individual multi-path location and magnitude out of a noisy background in the channel impulse response. A typical channel impulse magnitude response in a noisy wireless channel is shown in FIG. 1. Other applications of the channel impulse magnitude response detection include making use of the structured channel impulse response characteristic such as the concentrated channel response power distribution to decide the scattered pilot locations in DVB-H devices or Integrated Services Digital Broadcasting (ISDB) for Terrestrial Television/Sound Broadcasting (ISDB-T/ISDB-$T_{SB}$) systems for fast channel equalization, symbol timing recovery, and carrier frequency synchronizations.

Detection of the location and magnitude of multi-path echoes out of a noisy background in a channel impulse response can be beneficial to the design of efficient channel equalization and synchronization algorithms in modem digital (wireless) communication systems. Existing methods to detect the channel impulse response usually only focus on the global peaks of the noisy channel magnitude response. These techniques usually involve the iterative process of searching for the peak power or magnitude in the channel impulse response, removing it, and then searching for the subsequent largest peaks in the CSI. The computations involved in these techniques can be quite intensive especially when the number of multi-path echoes is large, since multiple sweeps of the channel impulse response is required to detect multiple echoes.

Alternatively, a semi sorting technique can be engaged to detect the first of several largest peaks in the channel impulse response according to certain threshold criteria. However, the computational complexity involved in the sorting-like technique is typically expensive and not generally suitable for application specific integrated circuit (ASIC) implementations. Another drawback for the above peak search type of techniques is the large memory requirement, since the entire channel impulse magnitude response generally has to be stored in memory to enable iterative peak search. Accordingly, there remains a need for a new and efficient technique for detecting the channel impulse magnitude response in digital communication systems.

SUMMARY

In view of the foregoing, an embodiment herein provides a method of detecting a channel impulse magnitude response in a digital communication system, and a program storage device readable by machine, tangibly embodying a program of instructions executable by the machine to perform the method of detecting a channel impulse magnitude response in a digital communication system, wherein the method comprises (a) providing a data set of at least one channel impulse magnitude response component and a plurality of noise response components; (b) calculating an average magnitude response of all components in the data set; (c) comparing a data point corresponding to a magnitude response in the data set with an immediately preceding data point corresponding to an immediately preceding magnitude response in the data set; (d) comparing the data point corresponding to the magnitude response in the data set with an immediately subsequent data point corresponding to an immediately subsequent magnitude response in the data set; (e) establishing a first data subset adjacent to the data point, the first data subset comprising a plurality of immediately preceding data points corresponding to a plurality of immediately preceding magnitude responses; (f) establishing a second data subset adjacent to the data point, the second data subset comprising a plurality of immediately subsequent data points corresponding to a plurality of immediately subsequent magnitude responses; (g) comparing the data point to an average magnitude response of the first data subset and an average magnitude response of the second data subset; and (h) classifying the data point as a non-noise channel impulse magnitude response in the digital communication system when the magnitude response of the data point is greater than (i) the average magnitude response of all components in the data set; and (ii) the average magnitude responses of the first and second data subsets.

The method may further comprise performing steps (a) through (h) for all data points in the data set. Additionally, the method may further comprise conducting the performing process exactly once for a given data set of at least one channel impulse magnitude response in the data set. Preferably, the digital communication system comprises any of a DTV system, a DVB-H system, and an ISDB-T/ISDB-$T_{SB}$ system. Preferably, the channel impulse magnitude response comprises a harmonic component in any of a signal spectrum and a power spectrum density distribution. Furthermore, the data point corresponding to the non-noise channel impulse magnitude response may comprise a multi-path echo in the digital communication system. Moreover, the classifying process may comprise determining a location and magnitude of the data point corresponding to the non-noise channel impulse magnitude response.

Another embodiment provides a system of detecting a channel impulse magnitude response in a digital communication system, wherein the system comprises a first processor adapted to provide a data set of at least one channel impulse magnitude response component and a plurality of noise response components; a calculator adapted to calculate an average magnitude response of all components in the data set; and a first comparator adapted to compare a data point corresponding to a magnitude response in the data set with an immediately preceding data point corresponding to an immediately preceding magnitude response in the data set; and compare the data point corresponding to the magnitude response in the data set with an immediately subsequent data point corresponding to an immediately subsequent magnitude response in the data set. The system further comprises a second processor adapted to establish a first data subset adjacent to the data point, the first data subset comprising a plurality of immediately preceding data points corresponding to a plurality of immediately preceding magnitude responses; and establish a second data subset adjacent to the data point, the second data subset comprising a plurality of immediately subsequent data points corresponding to a plurality of immediately subsequent magnitude responses. The system further comprises a second comparator adapted to compare the data point to an average magnitude response of the first data subset and an average magnitude response of the second data subset; and a classifier adapted to classify the data point as a non-noise channel impulse magnitude response in the digital communication system when the magnitude response of the data point is greater than (i) the average magnitude response of all components in the data set; and (ii) the average magnitude responses of the first and second data subsets.

Preferably, the classifier is further adapted to classify all data points in the data set as either a non-noise channel impulse magnitude response or a noise response in the digital communication system. Moreover, the digital communication system comprises any of a DTV system, a DVB-H system, and an ISDB-T/ISDB-T$_{SB}$ system. Furthermore, the channel impulse magnitude response comprises a harmonic component in any of a signal spectrum and a power spectrum density distribution. Additionally, the data point corresponding to the non-noise channel impulse magnitude response preferably comprises a multi-path echo in the digital communication system. Also, the classifier may be further adapted to determine a location and magnitude of the data point corresponding to the non-noise channel impulse magnitude response.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
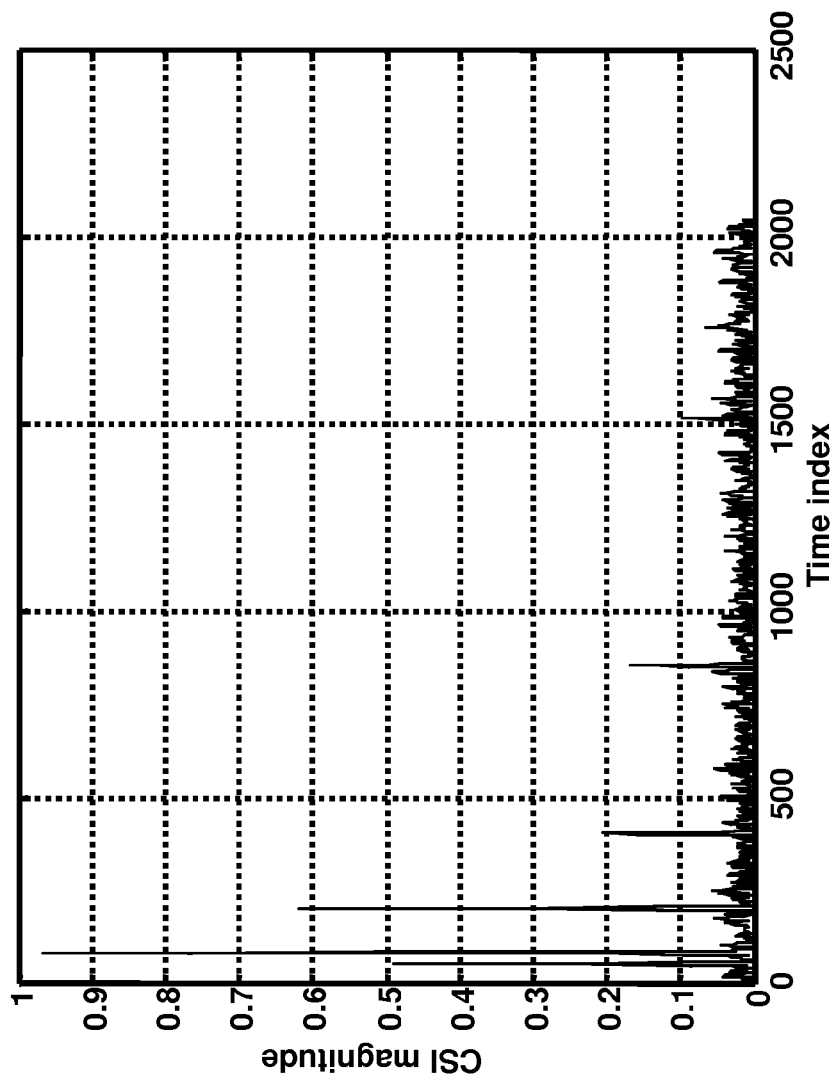
FIG. 1 illustrates a graphical representation of a typical noisy channel impulse magnitude response with six multi-path echoes according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new and efficient technique for detecting the channel impulse magnitude response in digital communication systems. The embodiments herein achieve this by providing a new and efficient technique for detecting the location and magnitude of multi-path echoes from a noisy background in a general channel impulse response. The techniques provided by the embodiments herein are computationally efficient and structured regular which is ideal for ASIC implementations. Referring now to the drawings, and more particularly to FIGS. 1 through 7, where similar reference characters denote corresponding features consistently throughout the figures, there are shown preferred embodiments.

According to the embodiments herein, noisy channel impulse magnitude response, which includes both multi-path echoes and noise can be viewed as a bundle of spikes regardless of the true multi-path echo peaks. The noise components can be viewed as a bundle of continuous spikes with much smaller magnitude compared to the multi-path echo components which usually include isolated spikes with large magnitude. Unfortunately, conventional techniques do not take advantage of the micro spike-like feature of the noise components, and therefore cannot achieve (1) reduced computational complexity; (2) regular computational structure; and (3) on-the-fly (on demand) sample processing capability. Based on this observation, the channel impulse detection technique provided by the embodiments herein is provided.

As mentioned, the embodiments herein can be used to detect the location and magnitude or power distribution in a noisy channel impulse response. In accordance with the embodiments herein, let csi be the channel impulse magnitude response variable of size N, threshold_local and threshold_global be the local and global thresholds respectively used for spike peak to background noise level comparisons. The flow of the technique provided by the embodiments herein is shown in FIGS. 2(A) and 2(B).

Figure 2A:
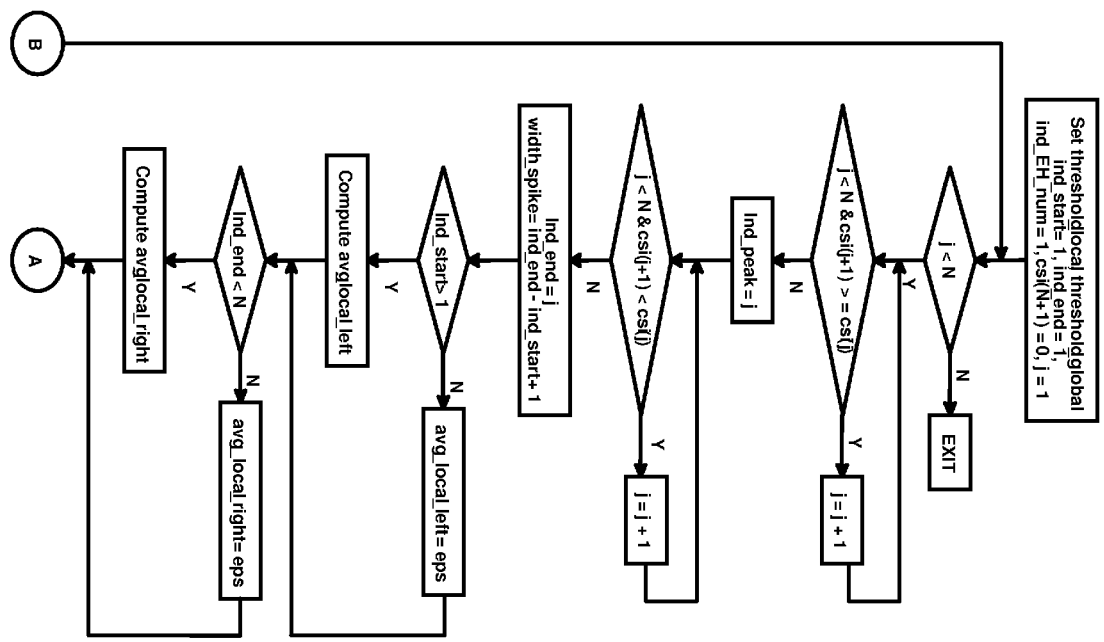
FIGS. 2(A) and 2(B) are flow diagrams illustrating a logical routine for implementing a CSI detection software application according to the embodiments herein.
Figure 2B:
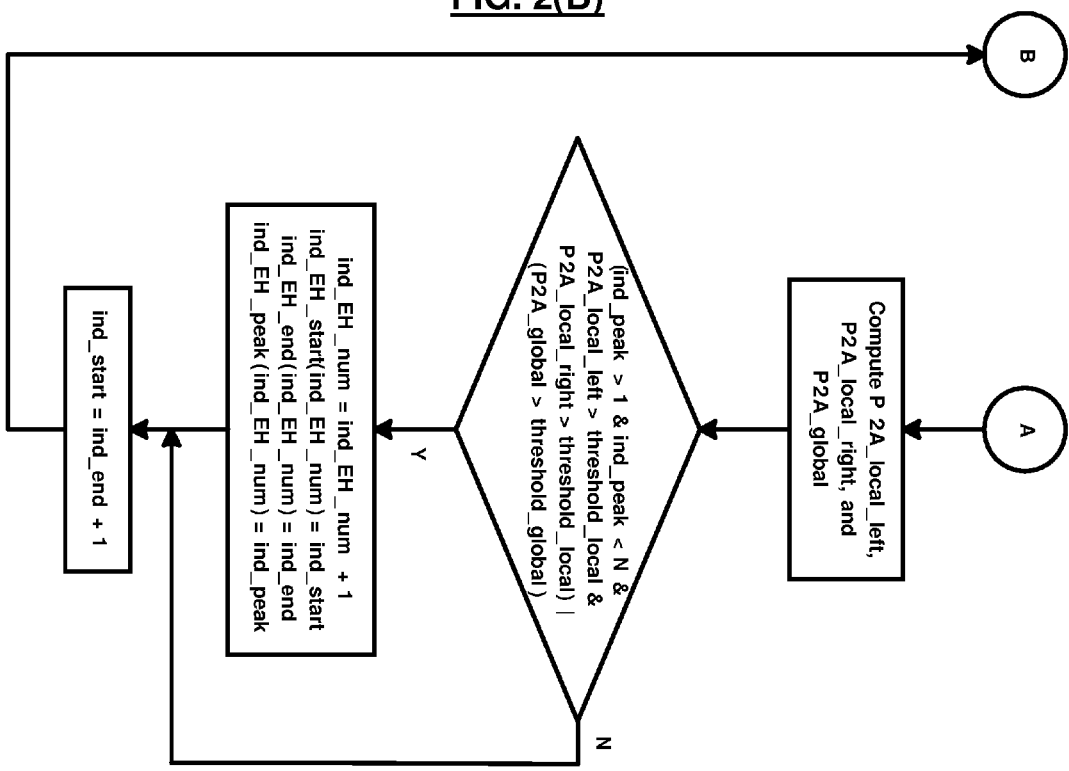

In FIGS. 2(A) and 2(B), the variables P2A_local_left, P2A_local_right, and P2A_global are the spike peak to average ratios which are set beforehand, and their values depend on the particular application, where both local average around the spike and the global average across the spectrum are considered. The local average are computed by extending a window of size K to both the left hand side of the spike and the right hand side of the spike which result in two average values avg_local_left and avg_local_right shown in FIGS. 2(A) and 2(B).

Figure 3:
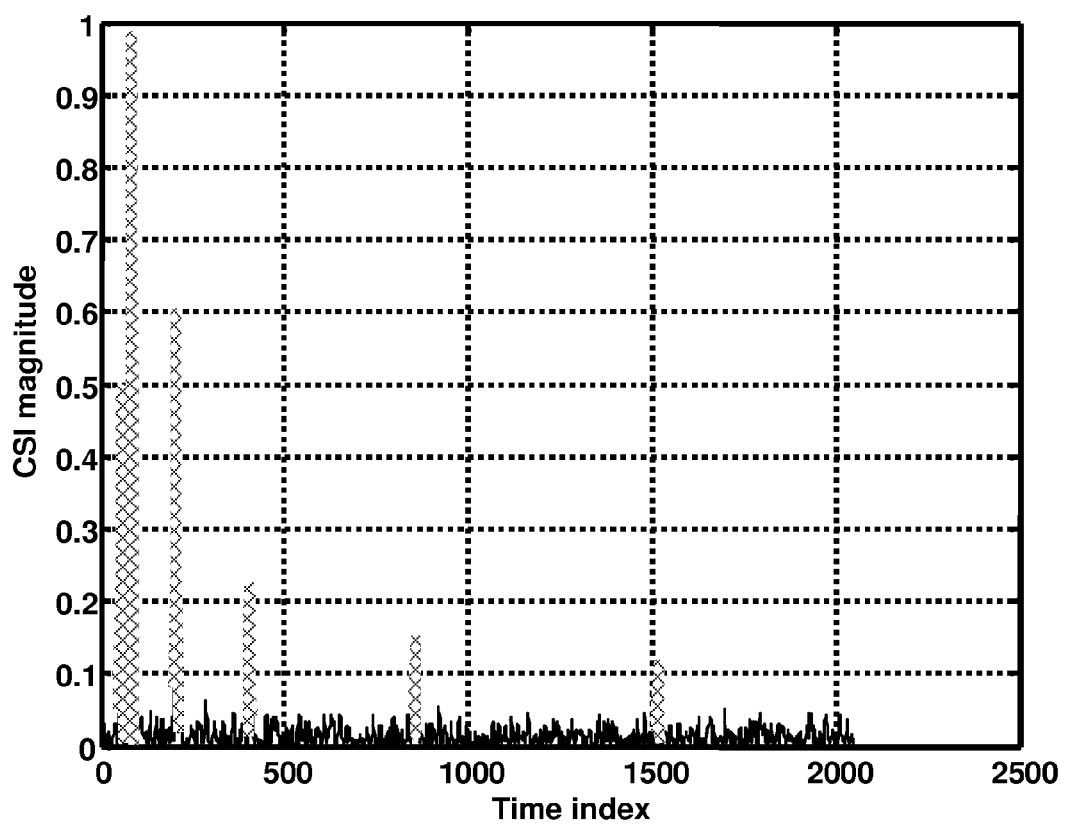
FIG. 3 illustrates a graphical representation of multi-path echo detection in a noisy channel impulse response according to an embodiment herein.

After the routine shown in FIGS. 2(A) and 2(B) completes, the total number of multi-path echoes is stored in variable ind_EH_num. The start, end, and peak value indexes of the corresponding identified echoes are stored in the arrays ind_EH_start, ind_EH_end, and ind_EH_peak. The above technique described in FIGS. 2(A) and 2(B) is adaptive with respect to the width of the interested multi-path echoes. The width of the echoes could depend on the Fast Fourier Transform (FFT) window shape in the Inverse Fast Fourier Transform (IFFT) process to estimate the channel impulse response. One example of the multi-path echo detection for a noisy channel impulse response shown in FIG. 1 is shown in FIG. 3. The detected six multi-path echoes are marked in the hatched line in FIG. 3. FIG. 3 is obtained by passing the noisy channel impulse response shown in FIG. 1 through the process described in FIGS. 2(A) and 2(B). FIG. 3 shows how the techniques provided by the embodiments herein can robustly detect the location and magnitude of the channel impulse response from a noisy environment.

Figure 4:
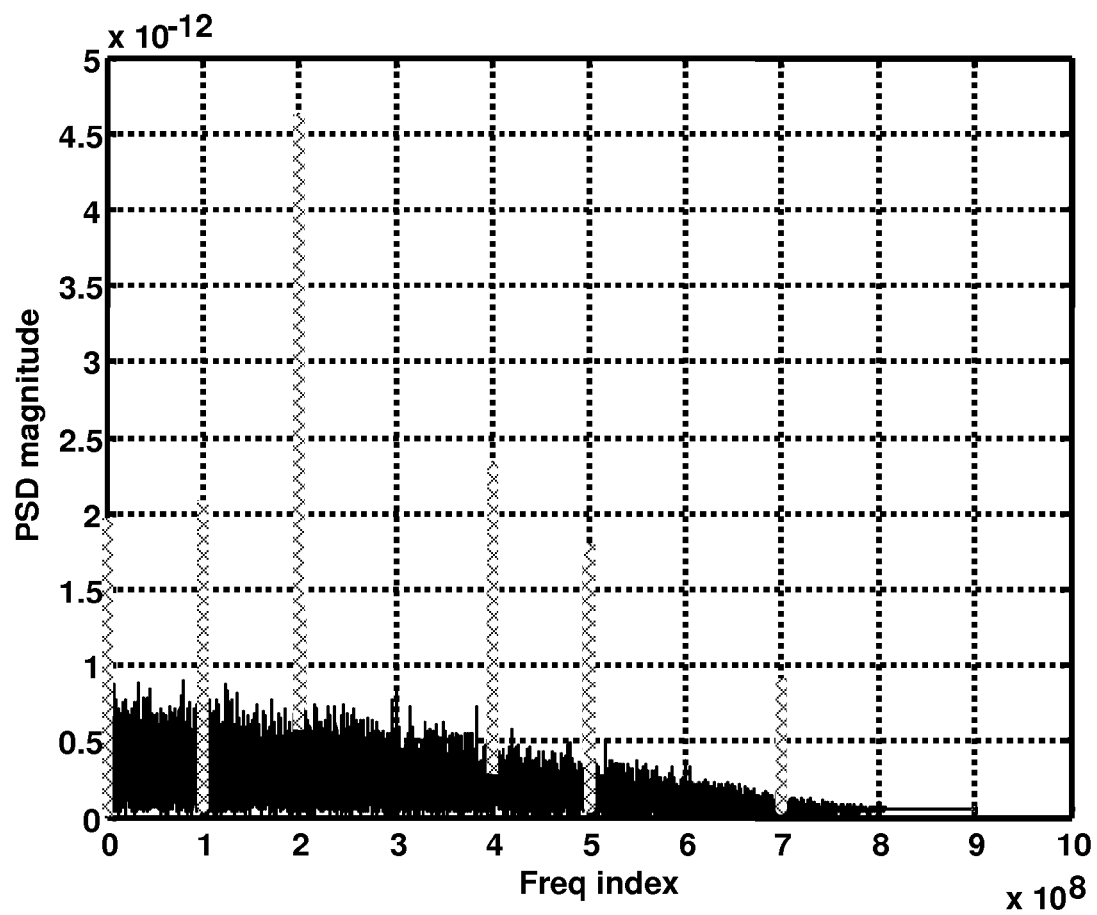
FIG. 4 illustrates a graphical representation of periodic harmonics detection in a noisy power spectrum density according to an embodiment herein.

The channel impulse response detection technique provided by the embodiments herein can also be used for the detection of harmonic components in signal spectrum or power spectrum density. One example is shown in FIG. 4. The detected six periodic harmonic components of the noisy power spectrum density are marked in the hatched line in FIG. 4. The six periodic harmonic components can represent, for example, the six periodic jitter components in their corresponding signal power spectrum density and thus can be used for jitter detection in signal integrity analysis. The channel impulse response detection technique provided by the embodiments herein can also be used in fast channel equalization and synchronization algorithms in DTV, DVB-H devices, and ISDB-T/ISDB-T$_{SB}$ systems.

Figure 5:
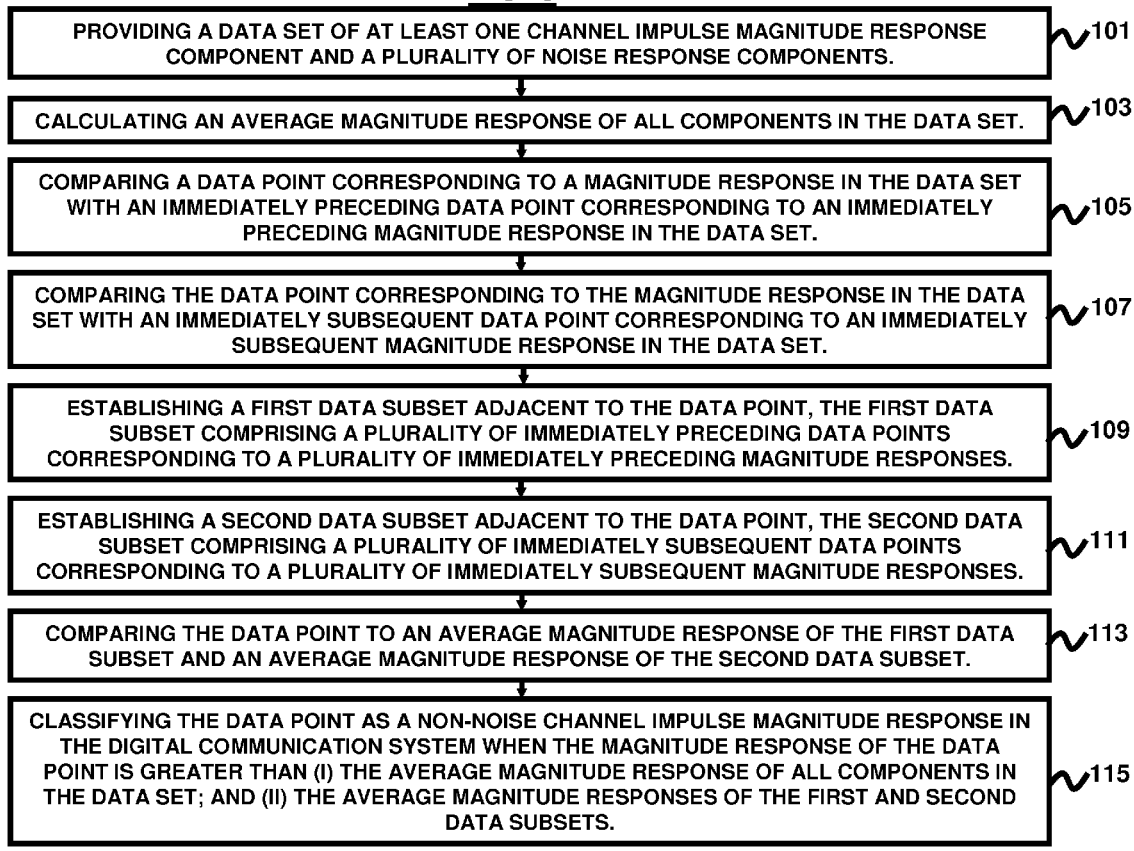
FIG. 5 is a flow diagram illustrating a preferred method according to an embodiment herein.

FIG. 5 is a flow diagram illustrating a method of detecting a channel impulse magnitude response in a digital communication system according to an embodiment herein, wherein the method comprises providing (101) a data set of at least one channel impulse magnitude response component and a plurality of noise response components; calculating (103) an average magnitude response of all components in the data set; comparing (105) a data point corresponding to a magnitude response in the data set with an immediately preceding data point corresponding to an immediately preceding magnitude response in the data set; comparing (107) the data point corresponding to the magnitude response in the data set with an immediately subsequent data point corresponding to an immediately subsequent magnitude response in the data set; establishing (109) a first data subset adjacent to the data point, the first data subset comprising a plurality of immediately preceding data points corresponding to a plurality of immediately preceding magnitude responses; establishing (111) a second data subset adjacent to the data point, the second data subset comprising a plurality of immediately subsequent data points corresponding to a plurality of immediately subsequent magnitude responses; comparing (113) the data point to an average magnitude response of the first data subset and an average magnitude response of the second data subset; and classifying (115) the data point as a non-noise channel impulse magnitude response in the digital communication system when the magnitude response of the data point is greater than (i) the average magnitude response of all components in the data set; and (ii) the average magnitude responses of the first and second data subsets.

The method may further comprise performing steps (101) through (115) for all data points in the data set. Additionally, the method may further comprise conducting the performing process exactly once for a given data set of at least one channel impulse magnitude response in the data set. Preferably, the digital communication system comprises any of a DTV system, a DVB-H system, and an ISDB-T/ISDB-T$_{SB}$ system. Preferably, the channel impulse magnitude response comprises a harmonic component in any of a signal spectrum and a power spectrum density distribution. Furthermore, the data point corresponding to the non-noise channel impulse magnitude response may comprise a multi-path echo in the digital communication system. Moreover, the classifying process (115) may comprise determining a location and magnitude of the data point corresponding to the non-noise channel impulse magnitude response.

The embodiments herein can take the form of an entirely hardware embodiment, an entirely software embodiment or an embodiment including both hardware and software elements. Preferably, the embodiments are implemented in software, which includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
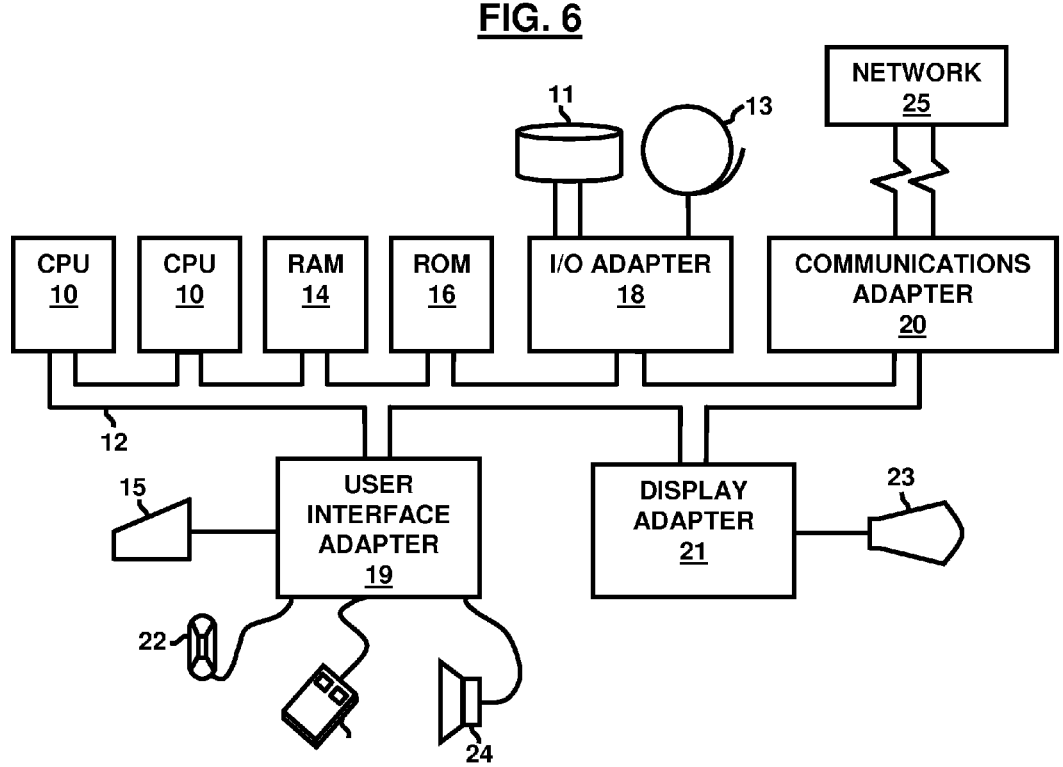
FIG. 6 illustrates a schematic diagram of a computer system according to an embodiment herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 7:
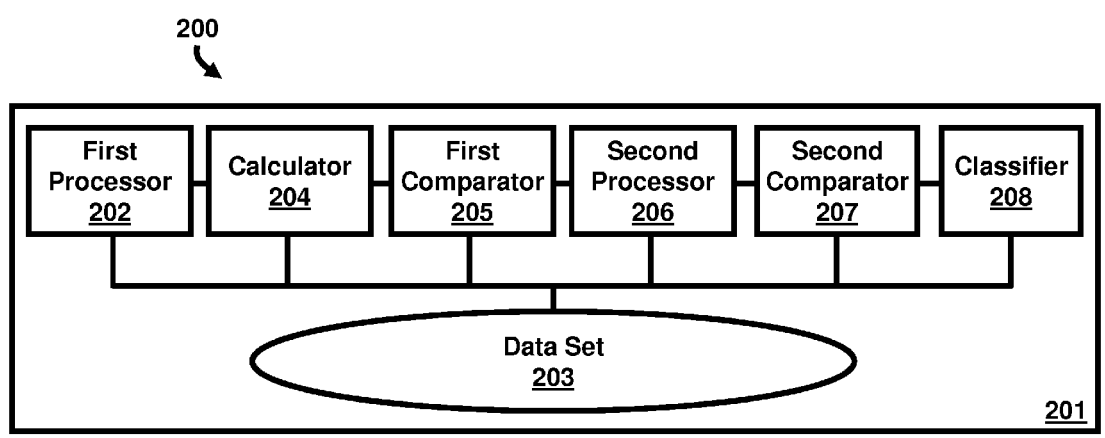
FIG. 7 illustrates a schematic diagram of a system according to an embodiment herein.

FIG. 7 is a system block diagram illustrating a system 200 of detecting a channel impulse magnitude response in a digital communication system 201, wherein the system 200 comprises a first processor 202 adapted to provide a data set 203 of at least one channel impulse magnitude response component and a plurality of noise response components; a calculator 204 adapted to calculate an average magnitude response of all components in the data set 203; and a first comparator 205 adapted to compare a data point corresponding to a magnitude response in the data set 203 with an immediately preceding data point corresponding to an immediately preceding magnitude response in the data set 203; and compare the data point corresponding to the magnitude response in the data set 203 with an immediately subsequent data point corresponding to an immediately subsequent magnitude response in the data set 203.

The system 200 further comprises a second processor 206 adapted to establish a first data subset adjacent to the data point, the first data subset comprising a plurality of immediately preceding data points corresponding to a plurality of immediately preceding magnitude responses; and establish a second data subset adjacent to the data point, the second data subset comprising a plurality of immediately subsequent data points corresponding to a plurality of immediately subsequent magnitude responses. The system 200 further comprises a second comparator 207 adapted to compare the data point to an average magnitude response of the first data subset and an average magnitude response of the second data subset; and a classifier 208 adapted to classify the data point as a non-noise channel impulse magnitude response in the digital communication system 201 when the magnitude response of the data point is greater than (i) the average magnitude response of all components in the data set; and (ii) the average magnitude responses of the first and second data subsets.

Preferably, the classifier 208 is further adapted to classify all data points in the data set as either a non-noise channel impulse magnitude response or a noise response in the digital communication system 201. Moreover, the digital communication system 201 comprises any of a DTV system, a DVB-H system, and an ISDB-T/ISDB-$T_{SB}$ system. Furthermore, the channel impulse magnitude response comprises a harmonic component in any of a signal spectrum and a power spectrum density distribution. Additionally, the data point corresponding to the non-noise channel impulse magnitude response preferably comprises a multi-path echo in the digital communication system. Also, the classifier 208 may be further adapted to determine a location and magnitude of the data point corresponding to the non-noise channel impulse magnitude response.

The embodiments herein provide an efficient technique to detect the location and magnitude of multi-path echoes in channel impulse response. The embodiments herein go through the channel impulse magnitude response only once and detect all the multi-path echoes, both location and magnitude, according to certain threshold criteria. The embodiments herein process the impulse magnitude response samples on-the-fly (on demand) and do not require the storage of the entire channel impulse magnitude response which makes it ideal for ASIC implementation. The embodiments herein detect the channel impulse magnitude response robustly regardless of the resolution of the IFFT window size and/or IFFT window shape which results in different channel echo width. The embodiments herein can be used as function blocks in advanced wireless channel equalization schemes and advanced signal integrity analysis tools. Specifically, the embodiments herein can be implemented in ASIC hardware advanced digital video broadcast over hand-held devices (DVB-H) receiver chips.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of detecting a channel impulse magnitude response in a digital communication system, said method comprising:
  (a) providing a data set of at least one channel impulse magnitude response component and a plurality of noise response components by a processor, wherein said data set comprises a plurality of data points each corresponding to a magnitude response;
  (b) calculating an average magnitude response of all components in said data set by a calculator;
  (c) comparing a data point corresponding to a magnitude response in said data set with an immediately preceding data point corresponding to an immediately preceding magnitude response in said data set;
  (d) comparing said data point corresponding to said magnitude response in said data set with an immediately subsequent data point corresponding to an immediately subsequent magnitude response in said data set;
  (e) establishing a first data subset adjacent to said data point, said first data subset comprising a plurality of immediately preceding data points corresponding to a plurality of immediately preceding magnitude responses;

(f) establishing a second data subset adjacent to said data point, said second data subset comprising a plurality of immediately subsequent data points corresponding to a plurality of immediately subsequent magnitude responses;

(g) comparing said data point to an average magnitude response of said first data subset and an average magnitude response of said second data subset; and (h) classifying said data point as a non-noise channel impulse magnitude response in said digital communication system when said magnitude response of said data point is greater than (i) said average magnitude response of all components in said data set; and (ii) the average magnitude responses of the first and second data subsets.

2. The method of claim 1, further comprising performing steps (a) through (h) for all data points in said data set.

3. The method of claim 2, further comprising conducting the performing process exactly once for a given data set of at least one channel impulse magnitude response in said data set.

4. The method of claim 1, wherein said digital communication system comprises any of a digital terrestrial television (DTV) system, a digital video broadcasting over handheld (DVB-H) system, and an Integrated Services Digital Broadcasting (ISDB) for Terrestrial Television/Sound Broadcasting (ISDB-T/ISDB-$T_{SB}$) system.

5. The method of claim 1, wherein said channel impulse magnitude response comprises a harmonic component in any of a signal spectrum and a power spectrum density distribution.

6. The method of claim 1, wherein said data point corresponding to said non-noise channel impulse magnitude response comprises a multi-path echo in said digital communication system.

7. The method of claim 1, wherein the classifying process comprises determining a location and magnitude of said data point corresponding to said non-noise channel impulse magnitude response.

8. A non-transitory computer readable program storage device embodying a program of instructions executable by a machine to perform a method of detecting a channel impulse magnitude response in a digital communication system, said method comprising:

(a) providing a data set of at least one channel impulse magnitude response component and a plurality of noise response components by a processor, wherein said data set comprises a plurality of data points each corresponding to a magnitude response;

(b) calculating an average magnitude response of all components in said data set by a calculator;

(c) comparing a data point corresponding to a magnitude response in said data set with an immediately preceding data point corresponding to an immediately preceding magnitude response in said data set;

(d) comparing said data point corresponding to said magnitude response in said data set with an immediately subsequent data point corresponding to an immediately subsequent magnitude response in said data set;

(e) establishing a first data subset adjacent to said data point, said first data subset comprising a plurality of immediately preceding data points corresponding to a plurality of immediately preceding magnitude responses;

(f) establishing a second data subset adjacent to said data point, said second data subset comprising a plurality of immediately subsequent data points corresponding to a plurality of immediately subsequent magnitude responses;

(g) comparing said data point to an average magnitude response of said first data subset and an average magnitude response of said second data subset; and (h) classifying said data point as a non-noise channel impulse magnitude response in said digital communication system when said magnitude response of said data point is greater than (i) said average magnitude response of all components in said data set; and (ii) the average magnitude responses of the first and second data subsets.

9. The device of claim 8, wherein said method further comprises performing steps (a) through (h) for all data points in said data set.

10. The device of claim 9, wherein said method further comprises conducting the performing process exactly once for a given data set of at least one channel impulse magnitude response in said data set.

11. The device of claim 8, wherein said digital communication system comprises any of a digital terrestrial television (DTV) system, a digital video broadcasting over handheld (DVB-H) system, and an Integrated Services Digital Broadcasting (ISDB) for Terrestrial Television/Sound Broadcasting (ISDB-T/ISDB-$T_{SB}$) system.

12. The device of claim 8, wherein said channel impulse magnitude response comprises a harmonic component in any of a signal spectrum and a power spectrum density distribution.

13. The device of claim 8, wherein said data point corresponding to said non-noise channel impulse magnitude response comprises a multi-path echo in said digital communication system.

14. The device of claim 8, wherein in said method, the classifying process comprises determining a location and magnitude of said data point corresponding to said non-noise channel impulse magnitude response.

15. A system of detecting a channel impulse magnitude response in a digital communication system, said system comprising:

a first processor adapted to provide a data set of at least one channel impulse magnitude response component and a plurality of noise response components, wherein said data set comprises a plurality of data points each corresponding to a magnitude response;

a calculator adapted to calculate an average magnitude response of all components in said data set;

a first comparator adapted to:
compare a data point corresponding to a magnitude response in said data set with an immediately preceding data point corresponding to an immediately preceding magnitude response in said data set; and
compare said data point corresponding to said magnitude response in said data set with an immediately subsequent data point corresponding to an immediately subsequent magnitude response in said data set;

a second processor adapted to:
establish a first data subset adjacent to said data point, said first data subset comprising a plurality of immediately preceding data points corresponding to a plurality of immediately preceding magnitude responses; and
establish a second data subset adjacent to said data point, said second data subset comprising a plurality of immediately subsequent data points corresponding to a plurality of immediately subsequent magnitude responses;

a second comparator adapted to compare said data point to an average magnitude response of said first data subset and an average magnitude response of said second data subset; and a classifier adapted to classify said data point as a non-noise channel impulse magnitude response in said digital communication system when said magnitude response of said data point is greater than (i) said average magnitude response of all components in said data set; and (ii) the average magnitude responses of the first and second data subsets.

16. The system of claim 15, wherein said classifier is further adapted to classify all data points in said data set as either a non-noise channel impulse magnitude response or a noise response in said digital communication system.

17. The system of claim 15, wherein said digital communication system comprises any of a digital terrestrial television (DTV) system, a digital video broadcasting over handheld (DVB-H) system, and an Integrated Services Digital Broadcasting (ISDB) for Terrestrial Television/Sound Broadcasting (ISDB-T/ISDB-$T_{SB}$) system.

18. The system of claim 15, wherein said channel impulse magnitude response comprises a harmonic component in any of a signal spectrum and a power spectrum density distribution.

19. The system of claim 15, wherein said data point corresponding to said non-noise channel impulse magnitude response comprises a multi-path echo in said digital communication system.

20. The system of claim 15, wherein said classifier is further adapted to determine a location and magnitude of said data point corresponding to said non-noise channel impulse magnitude response.

* * * * *